United States Patent
Brown et al.

(10) Patent No.: US 6,302,346 B1
(45) Date of Patent: Oct. 16, 2001

(54) SEAT BELT WEBBING ENERGY MANAGEMENT DEVICE

(75) Inventors: Louis R. Brown, Oxford; Roger H. Garrell, Lake Orion, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/483,244

(22) Filed: Jan. 14, 2000

(51) Int. Cl.[7] .................................................. B65H 75/48
(52) U.S. Cl. ...................... 242/379.1; 242/371; 242/379; 280/801.1; 280/805; 280/806; 297/468; 297/470; 297/472; 297/478
(58) Field of Search ..................................... 242/371, 379, 242/379.1; 280/801.1, 805, 806; 297/472, 478, 480, 468, 470

(56) References Cited

U.S. PATENT DOCUMENTS

| Re. 29,147 | | 3/1977 | Fiala ............................. 242/107.4 A |
|---|---|---|---|
| 3,606,378 | * | 9/1971 | Prostran ................................ 280/150 |
| 5,320,385 | | 6/1994 | Schmid et al. ....................... 280/805 |
| 5,340,046 | | 8/1994 | Schroth et al. ...................... 242/407 |
| 5,628,470 | * | 5/1997 | Ray et al. ........................... 242/375.3 |
| 5,738,293 | | 4/1998 | Fohl .................................... 242/374 |
| 5,934,595 | * | 8/1999 | Kohlndorfer et al. ............. 242/375.3 |

* cited by examiner

Primary Examiner—Donald P. Walsh
Assistant Examiner—Mark J. Beauchaine
(74) Attorney, Agent, or Firm—Tarolli, Sundheim, Covell, Tummino & Szabo L.L.P.

(57) ABSTRACT

An energy management device (10) for seat belt webbing (18) for restraining a vehicle occupant includes a base (40) for attachment to the vehicle. The device (10) also includes a plastically deformable torsion bar (60) having a first portion (66) fixed relative to the base (40) and a second portion (72) rotatable relative to the first portion and the base. The torsion bar (60) twists upon rotation of the second portion (72) relative to the first portion (66). A spool (80) is supported on the base (40) and is fixed for rotation with the second portion (72) of the torsion bar (60) relative to the first portion (66) of the torsion bar. The spool (80) has an outer peripheral surface (90). A flexible member (100) is wound on the outer peripheral surface (90) of the spool (80). The flexible member (100) has a first end portion (104) connected with the spool (80) and a second end portion (110) extending from the spool (80) for connection with the seat belt webbing (14) of the vehicle. The torsion bar (60) twists and the spool (80) rotates in an unwinding direction upon the application of tensile force from the seat belt webbing (18) to the flexible member (100) in an amount exceeding a predetermined amount. The torsion bar (60) when twisting resists unwinding of the flexible member (100) from the spool (80). The distance between the axis of rotation (54) of the spool (80) and the outer peripheral surface (90) of the spool (80) varies to vary the resistance to unwinding of the flexible member (100) felt by the occupant. The resistance to unwinding varies as a function of the amount of the flexible member that is unwound from the spool.

8 Claims, 2 Drawing Sheets

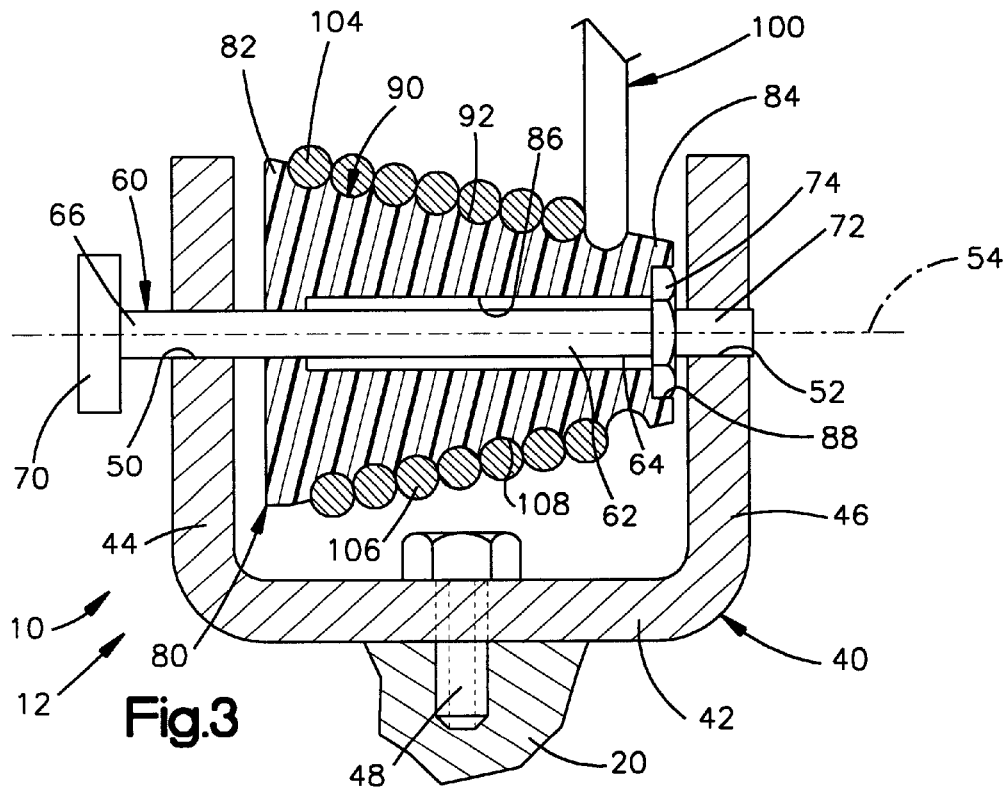
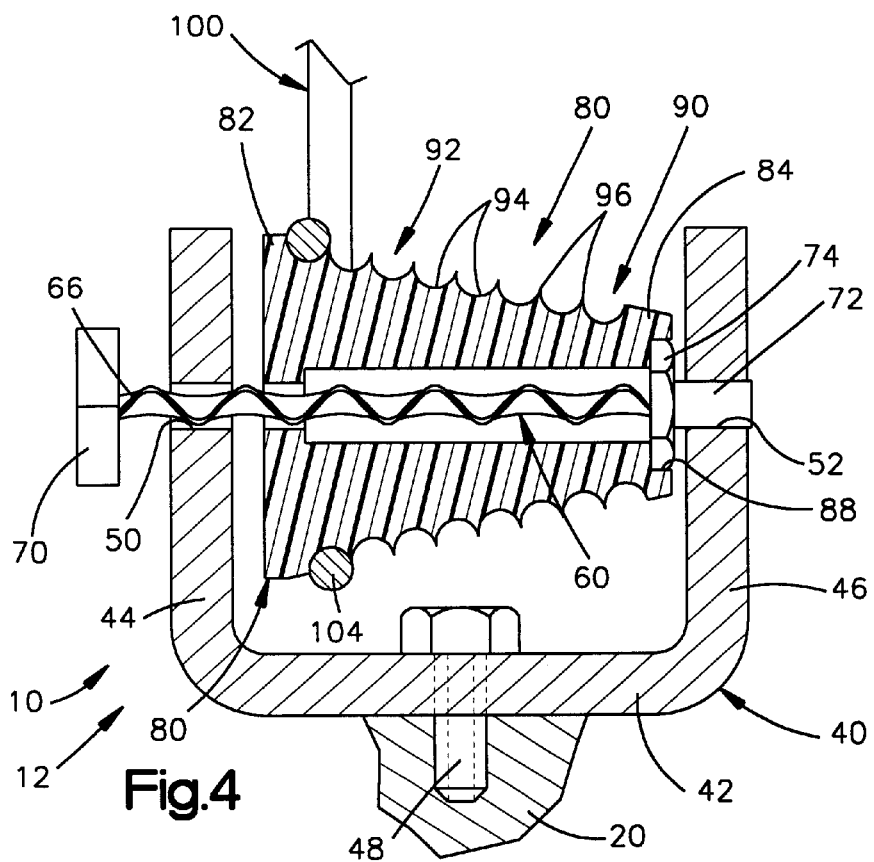

US 6,302,346 B1

SEAT BELT WEBBING ENERGY MANAGEMENT DEVICE

BACKGROUND OF THE INVENTION

1. Technical Field

The present invention relates to an apparatus for helping to protect a vehicle occupant in the event of a collision. In particular, the present invention relates to an energy management device for seat belt webbing used in a vehicle seat belt system.

2. Description of the Prior Art

Seat belt systems are commonly used to restrain vehicle occupants. A typical seat belt system for restraining a vehicle occupant includes a length of belt webbing extensible about the occupant and having opposite ends anchored to the vehicle. In the event of sudden deceleration such as occurs in a vehicle collision, the occupant tends to move forward relative to the vehicle and is restrained by the belt webbing.

The vehicle occupant can experience a sudden load if the occupant's forward movement is restrained by an inextensible length of belt webbing. To alleviate this sudden load, it is known to provide an energy management device in the seat belt system. When the occupant engages the belt webbing with sufficient force, the energy management device allows the belt webbing to extend slightly. The occupant's movement is restrained at a reduced rate over an increased period of time. This can reduce the maximum load experienced by the vehicle occupant.

One known type of energy management device is described in U.S. Pat. No. Re. 29,147 and includes a length of belt webbing wound on a spool. The spool is mounted on a frame that also includes a plastically deformable torsion bar. When the force on the belt webbing exceeds a predetermined amount, the torsion bar twists, and the spool rotates, enabling the belt webbing to be unwound from the spool.

SUMMARY OF THE INVENTION

The present invention is an energy management device for seat belt webbing for restraining a vehicle occupant. The device includes a base for attachment to the vehicle. The device also includes a plastically deformable torsion bar having a first portion fixed relative to the base and a second portion rotatable relative to the first portion and the base. The torsion bar twists upon rotation of the second portion relative to the first portion. A spool is supported on the base. The spool is fixed for rotation with the second portion of the torsion bar relative to the first portion of the torsion bar. The spool has an axis of rotation and an outer peripheral surface disposed at a distance from the axis of rotation. A flexible member is wound on the outer peripheral surface of the spool. The flexible member has a first end portion connected with the spool and a second end portion extending from the spool for connection with the seat belt webbing of the vehicle. The torsion bar twists and the spool rotates in an unwinding direction upon the application of tensile force from the seat belt webbing to the flexible member in an amount exceeding a predetermined amount, the torsion bar when twisting resisting unwinding of the flexible member from the spool. The distance between the axis of rotation of the spool and the outer peripheral surface of the spool on which the flexible member is wound varies to vary the resistance to unwinding of the flexible member felt by the occupant. The resistance to unwinding varies as a function of the amount of the flexible member that is unwound from the spool.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged sectional view of the energy management device of FIG. 2; and FIG. 4 is a sectional view similar to FIG. 3 showing the energy management device in an actuated condition.

DESCRIPTION OF A PREFERRED EMBODIMENT

Figure 1:
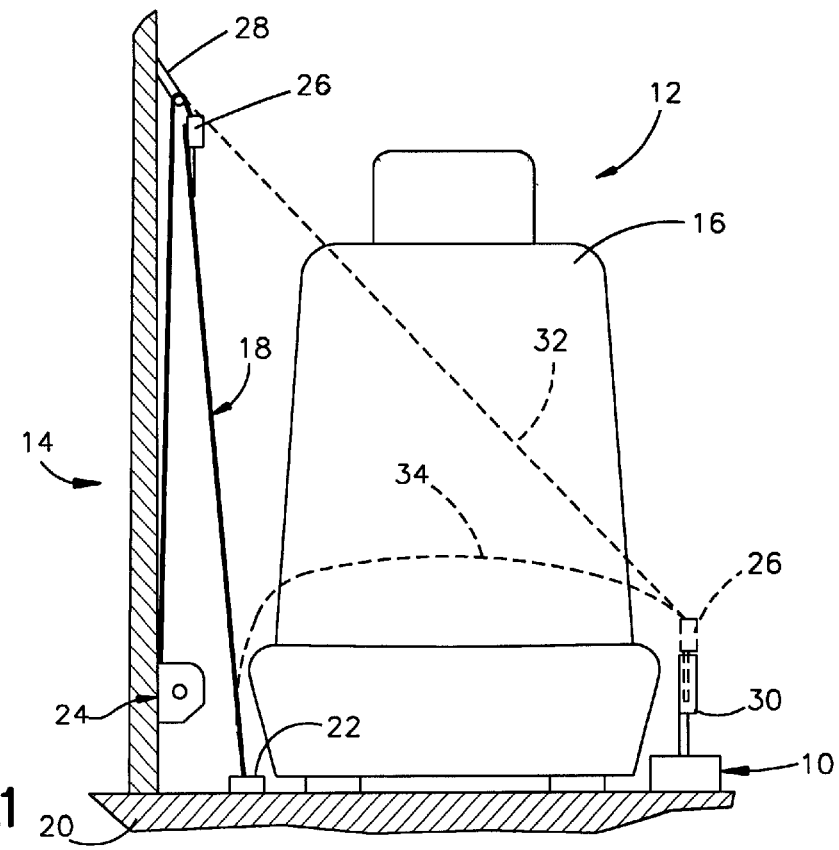
FIG. 1 is a schematic illustration of a vehicle seat belt system including a seat belt webbing energy management device which is constructed in accordance with the present invention.

The present invention relates to an apparatus for helping to protect a vehicle occupant and, in particular, to an energy management device for seat belt webbing in a vehicle seat belt system. As representative of the present invention, FIG. 1 illustrates an energy management device 10. The energy management device 10 is incorporated in a three-point continuous loop seat belt system 12 for use in restraining an occupant of a vehicle 14.

During operation of the vehicle 14, an occupant of the vehicle sits on a seat 16, which is illustrated as a front passenger seat of the vehicle. A length of belt webbing 18 is extensible about the vehicle occupant. One end of the length of belt webbing 18 is anchored to the vehicle body 20 at an anchor point 22. The opposite end of the belt webbing 18 is attached to a retractor 24 secured to the vehicle body 20. Intermediate its ends, the belt webbing 18 passes through a tongue assembly 26 and a D-ring or turning loop 28. When the seat belt system 12 is not in use, the belt webbing 18 is wound on the retractor 24 and is oriented generally vertically on one side of the seat 16, as shown in solid lines in FIG. 1.

To engage the seat belt system 12, the tongue assembly 26 is manually grasped and is pulled across the lap and torso of the occupant sitting in the seat 16. As the tongue assembly 26 is pulled across the lap and torso of the occupant, the tongue assembly moves along the belt webbing 18, and the belt webbing is unwound from the retractor 24. When the belt webbing 18 has been pulled across the lap and torso of the occupant, the tongue assembly 26 is connected with a buckle 30, as shown in dashed lines in FIG. 1. The buckle 30 is connected to the vehicle body 20 by the energy management device 10 and is disposed on the side of the seat 16 opposite the anchor point 22 and the retractor 24. When the seat belt system 12 is thus buckled, the length of belt webbing 18 is divided by the tongue assembly 26 into a torso portion 32, which extends across the torso of the occupant, and a lap portion 34, which extends across the lap of the occupant.

The energy management device 10 (FIGS. 2 and 3) includes a base 40 preferably made from metal such as steel. The base 40 has a generally U-shaped configuration including a bottom wall 42 and spaced, parallel first and second side walls 44 and 46. A fastener 48 extends through the bottom wall 42 to secure the base 40 to the vehicle body 20.

A circular opening 50 is formed in the first side wall 44 of the base 40. A circular opening 52 is formed in the second side wall 46 of the base 40. The openings 50 and 52 are centered on an axis 54.

The energy management device 10 also includes a torsion bar 60. The torsion bar 60 is made from a ductile metal that enables the torsion bar to be twisted about the axis 54 up to five or six revolutions without breaking. The torsion bar 60 has an elongate cylindrical main body portion 62 centered on the axis 54. The main body portion 62 has a cylindrical outer surface 64.

A first end portion 66 of the torsion bar 60 extends through the circular opening 50 in the first side wall 44 of the base 40 and is received in a pretensioner module 70. The pretensioner module 70 is fixed in position relative to the base 40. The pretensioner module 70 is capable, when actuated, of rotating the torsion bar 60. Normally, however, the pretensioner module is in a locked condition preventing rotation of the first end portion 66 of the torsion bar 60. As a result, the first end portion 66 of the torsion bar 60 is blocked from rotation relative to the base 40.

An opposite second end portion 72 of the torsion bar 60 extends through the circular opening 52 in the second side wall 46 of the base 40. The second end portion 72 of the torsion bar 60 is supported on the base 40 for rotation relative to the base. The second end portion 72 of the torsion bar 60 also includes a hexagonal nut 74 axially inward of the side wall 46. The nut 74 may be a separate piece that is secured to the main body portion 62 of the torsion bar 60, or may be formed as one piece with the main body portion.

The energy management device 10 includes a spool 80. The spool 80 is a one-piece member preferably molded from plastic. The spool 80 has first and second opposite end portions 82 and 84. A cylindrical central passage 86 extends through the main body portion of the spool 80. The torsion bar 60 extends axially through the passage 86 in the spool 80. The torsion bar 60 and the spool 80 are thus coaxial, forming a compact package.

The central passage 86 in the spool 80 terminates in a hexagonal opening 88 in the second end portion 84 of the spool. The hexagonal nut 74 on the second end portion 72 of the torsion bar 60 is received in the hexagonal opening 88 in the spool 80. As a result, the second end portion 84 of the spool 80 is fixed for rotation with the second end portion 72 of the torsion bar 60 relative to the base 40. The first end portion 82 of the spool 80 is rotatable relative to the torsion bar 60.

The spool 80 has an outer peripheral surface 90 (FIG. 4) on which is formed a spiral groove 92. The surfaces that define the spiral groove 92 form a part of the outer peripheral surface 90 of the spool 80. Adjacent turns 94 of the spiral groove 92 are separated by radially projecting lands 96.

The outer peripheral surface 90 of the spool 80 has a non-cylindrical configuration. The first end portion 82 of the spool 80 is substantially larger in diameter than the second end portion 84 of the spool. In the illustrated embodiment, the surface 90 has a conical configuration or uniform taper throughout its length. Thus, the change in the radius of the groove 92 over any given axial section of the spool 80 having a particular length is the same as the change in the radius of the groove over any other equal length section of the spool. (As used here, the word "radius" refers to the radial distance from the axis 54 to the groove 92.)

The outer peripheral surface 90 of the spool 80 may, alternatively, have a non-conical configuration. If this is the case, then the change in the radius of the groove 92 over any given axial section of the spool having a particular length is not always the same as the change in the radial distance over any other equal length section of the spool.

The energy management device 10 further includes a cable 100. The cable 100 is an elongate flexible member interconnecting the spool 80 and the buckle 30 in a force-transmitting relationship. The cable 100 is preferably a coated steel wire.

A first end portion 104 of the cable 100 is fixed to the first end portion 82 of the spool 80. An intermediate portion 106 of the cable 100 is wrapped around a central portion 108 of the outer peripheral surface 90 of the spool 80, in the spiral groove 92. The cable 100 then extends, from a point on the outer peripheral surface 90 at the second end portion 84 of the spool 80, to the buckle 30. A second end portion 110 of the cable 100 is fixed to the buckle 30 as indicated schematically at 112.

Figure 2:
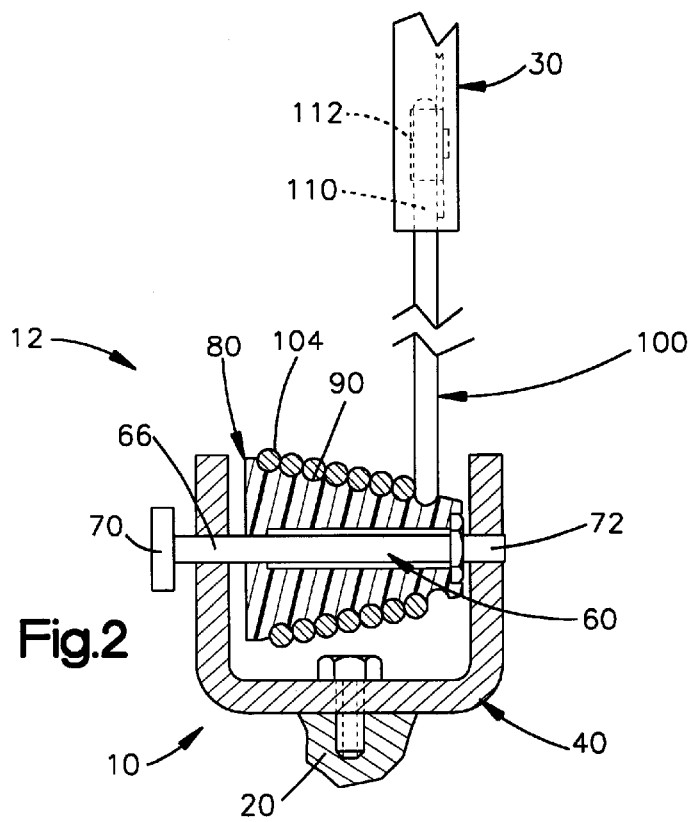
FIG. 2 is a sectional view of the energy management device of FIG. 1 shown attached to a seat belt buckle of the seat belt system and in an unactuated condition.

The energy management device 10 is illustrated in FIGS. 1–3 in an unactuated condition. When the energy management device 10 is in the unactuated condition, the torsion bar 60 is in an untwisted condition. The inherent resistance to deformation of the metal of the torsion bar 60 resists rotation of the spool 80 about the axis 54. So long as this resistance to rotation exceeds the force on the torsion bar 60 from the buckle 30, the spool 80 does not rotate, the cable 100 does not unwind from the spool, and the buckle does not move in a direction to extend the belt webbing 18.

The buckle 30 moves away from the vehicle body 20 only when a tensile force greater than a predetermined force is applied to the buckle and thus to the torsion bar 60. The predetermined force is selected to be a force which is not experienced during use of the vehicle safety system 12 other than in a vehicle collision. Thus, the energy management device 10 is normally in the unactuated condition shown in FIGS. 2 and 3 in which the torsion bar 60 is not twisted.

In the event of sudden deceleration such as occurs in a vehicle collision, the vehicle occupant moves forward in the vehicle relative to the vehicle body 20 and applies force against the belt webbing 18. The kinetic energy of the forward moving vehicle occupant is transmitted through the belt webbing 18 and the buckle 30 into the energy management device 10 and, specifically, into the cable 100. In addition, the pretensioner module 70 may be actuated to rotate the torsion bar 60 and wind up the cable 100 on the spool 80. This action draws the buckle 30 downward as viewed in FIG. 2 and draws the belt webbing more tightly about the vehicle occupant. A tensile force greater than the predetermined force may be applied through the cable 100 into the spool 80.

If a tensile force greater than the predetermined force is applied to the spool 80, that force is transmitted through the nut 74 into the second end portion 72 of the torsion bar 60. Because the first end portion 66 of the torsion bar 60 is blocked by the pretensioner module 70 from rotation in a direction to unwind the cable 100 from the spool 60, the torsion bar begins to deform plastically by twisting. As the torsion bar 60 twists over a period of time, the spool 80 rotates, allowing the cable 100 to unwind and the buckle 30 to move away from the energy management device 10. The torsion bar 60 while twisting resists this movement of the buckle 30, and this resistance restrains the occupant's forward movement. The occupant's movement is restrained at a reduced rate over an increased period of time. This can reduce the maximum load experienced by the vehicle occupant.

Each successive increment of rotation of the spool 80 causes the torsion bar 60 to twist a greater amount. The resistance that the torsion bar 60 applies to rotation of the spool 80 is constant. Because of the changing spool diameter, however, the resistance felt by the vehicle occupant changes.

Specifically, as the spool 80 rotates, the point at which the cable 100 extends from the outer peripheral surface 90 of the spool moves axially along the length of the spool. Specifically, the point at which the cable 100 extends from the outer peripheral surface 90 of the spool 80 moves axially, from the smaller diameter first end portion 82 of the spool in a direction toward the larger diameter second end portion 84 of the spool. This movement increases the lever arm with which the tensioned cable 100 applies force to the spool. The cable 100 effectively applies more rotational force to the spool 80, to twist the torsion bar 60. This results in the vehicle occupant not experiencing an increasing or linear resistance to forward movement, but rather, in the illustrated embodiment, experiencing a decreasing resistance to forward movement.

The torsion bar 60 and the spool 80 can be configured so that the resistance experienced by the vehicle occupant increases as a function of the amount of the cable 100 that is unwound from the spool. Also, the torsion bar 60 and the spool 80 can be configured so that the resistance experienced by the vehicle occupant both decreases for a time and increases for a time as the cable 100 is unwound from the spool.

The twisting of the torsion bar 60 is not instantaneous but instead occurs over a period of time. During this time period, the seat belt system 12 does not fully block forward movement of the vehicle occupant. The occupant's forward movement does not cease until the cable is fully unwound from the spool.

The rate of twisting of the torsion bar 60 is one factor which controls the period of time which is needed to operate the energy management device 10 from the unactuated condition to a fully actuated condition. In addition, varying the taper of the spool 80 over its length can provide different amounts of resistance to unwinding of the cable 100, so that the characteristics of the energy management device 10 can be controlled as desired.

From the above description of the invention, those skilled in the art will perceive improvements, changes and modifications in the invention. For example, the spool 80 can be configured in an alternative manner to vary the radius of the spool. For example, the radius of the groove 92 can vary circumferentially around the spool 80, in an elliptical manner. Also, the energy management device 10 can be incorporated in the seat belt system 12 at a location other than the buckle 30, such as at the anchor point 22 (FIG. 1). Such improvements, changes and modifications within the skill of the art are intended to be covered by the appended claims.

Having described the invention, we claim:

1. An energy management device for seat belt webbing for restraining a vehicle occupant, comprising:

a base for attachment to the vehicle;

a plastically deformable torsion bar having a first portion fixed relative to said base and a second portion rotatable relative to said first portion and said base, said torsion bar twisting upon rotation of said second portion relative to said first portion;

a spool supported on said base, said spool being fixed for rotation with said second portion of said torsion bar relative to said first portion of said torsion bar, said spool having an axis of rotation and an outer peripheral surface disposed at a distance from the axis of rotation; and a flexible member wound on said outer peripheral surface of said spool, said flexible member having a first end portion connected with said spool and a second end portion extending from said spool for connection with the seat belt webbing of the vehicle;

said torsion bar twisting and said spool rotating in an unwinding direction upon the application of tensile force from the seat belt webbing to said flexible member in an amount exceeding a predetermined amount, said torsion bar when twisting resisting unwinding of said flexible member from said spool;

the distance between the axis of rotation of said spool and said outer peripheral surface of said spool on which said flexible member is wound varying to vary the resistance to unwinding of said flexible member felt by the occupant as a function of the amount of said flexible member that is unwound from said spool.

2. An energy management device as set forth in claim 1 wherein said torsion bar and said spool are coaxial, said torsion bar comprising an elongate member extending axially through said spool.

3. An energy management device as set forth in claim 1 wherein the distance between the axis of rotation of said spool and said outer peripheral surface varies over the axial length of said spool.

4. An energy management device as set forth in claim 1 wherein said outer peripheral surface of said spool has a groove on which said flexible member is wound.

5. An energy management device as set forth in claim 4 wherein the distance between the axis of rotation of said spool and said groove varies over the axial length of said spool.

6. An energy management device as set forth in claim 1 further comprising a pretensioner connected with said spool for rotating said spool to wind said flexible member on said spool.

7. An energy management device as set forth in claim 1 wherein the resistance experienced by the vehicle occupant decreases as said flexible member is unwound from said spool.

8. An energy management device as set forth in claim 1 wherein each increment of rotation of said spool causes said torsion bar to twist a greater amount and wherein the point at which said cable extends from said outer peripheral surface of said spool moves during rotation of said spool from a smaller diameter portion of said spool in a direction toward a larger diameter portion of said spool.

* * * * *